United States Patent [19]
Belanger et al.

[11] Patent Number: 5,634,547
[45] Date of Patent: Jun. 3, 1997

[54] APPARATUS FOR AUTOMATED SORTING OF PLASTIC UTENSILS

[75] Inventors: Donald R. Belanger, Merrimack; David M. Lorenzo, Londonderry; Ronald L. Downing, Merrimack, all of N.H.

[73] Assignee: George Gordon Associates, Inc., Nashua, N.H.

[21] Appl. No.: 343,376

[22] Filed: Nov. 22, 1994

[51] Int. Cl.$^6$ .................................................. B65G 47/31
[52] U.S. Cl. ............................................ 198/397; 198/443
[58] Field of Search ................................ 198/443, 397, 198/461.2, 560; 406/86, 88, 89

[56] References Cited

U.S. PATENT DOCUMENTS

| | | | |
|---|---|---|---|
| 1,986,109 | 1/1935 | Jowett | 198/560 X |
| 2,112,309 | 3/1938 | Santillan | 198/560 X |
| 2,159,851 | 5/1939 | Hicks | 198/48 |
| 2,609,912 | 9/1952 | Engel | 198/397 |
| 2,709,412 | 5/1955 | Eagerman | 198/560 X |
| 2,734,620 | 2/1956 | Fischer et al. | 198/443 X |
| 2,954,862 | 10/1960 | Clark | 198/443 |
| 3,392,815 | 7/1968 | Skeels, Sr. et al. | 198/397 X |
| 3,907,135 | 9/1975 | Populin et al. | 198/443 X |
| 4,082,177 | 4/1978 | Aidlin et al. | 198/443 X |
| 4,860,881 | 8/1989 | Sticht | 198/443 |
| 4,892,182 | 1/1990 | Gustafsson | 198/454 |
| 4,967,541 | 11/1990 | Lakey | 53/550 |
| 5,037,245 | 8/1991 | Smith | 406/89 X |
| 5,070,679 | 12/1991 | Lakey | 53/550 |
| 5,072,575 | 12/1991 | Lakey | 53/450 |
| 5,143,506 | 9/1992 | Sticht | 198/443 X |
| 5,318,165 | 6/1994 | Spatafora et al. | 198/560 X |
| 5,333,718 | 8/1994 | Pannell et al. | 198/397 |
| 5,423,431 | 6/1995 | Westin | 198/443 X |
| 5,484,048 | 1/1996 | Ohta et al. | 198/443 X |

*Primary Examiner*—David A. Bucci
*Attorney, Agent, or Firm*—Daniel J. Bourque; Kevin J. Carroll

[57] ABSTRACT

An apparatus for handling irregular shaped linear items comprising a hopper for holding a plurality of irregular shaped linear items, and a lifting device operable with the hopper for upwardly removing the items from the hopper. The upward movement of the lifting device rotates the items in the hopper providing a substantially parallel and transverse feed alignment of the items to the lifting device. The apparatus further includes a device to separate and deliver product or items in spaced relationship, and a device for delivering the spaced product to a continuously moving conveyor. The continuously moving conveyor delivers product to a v-shaped trough where the trough angle is selected to provide downward deflection of product or items delivered by the moving conveyor system.

23 Claims, 6 Drawing Sheets

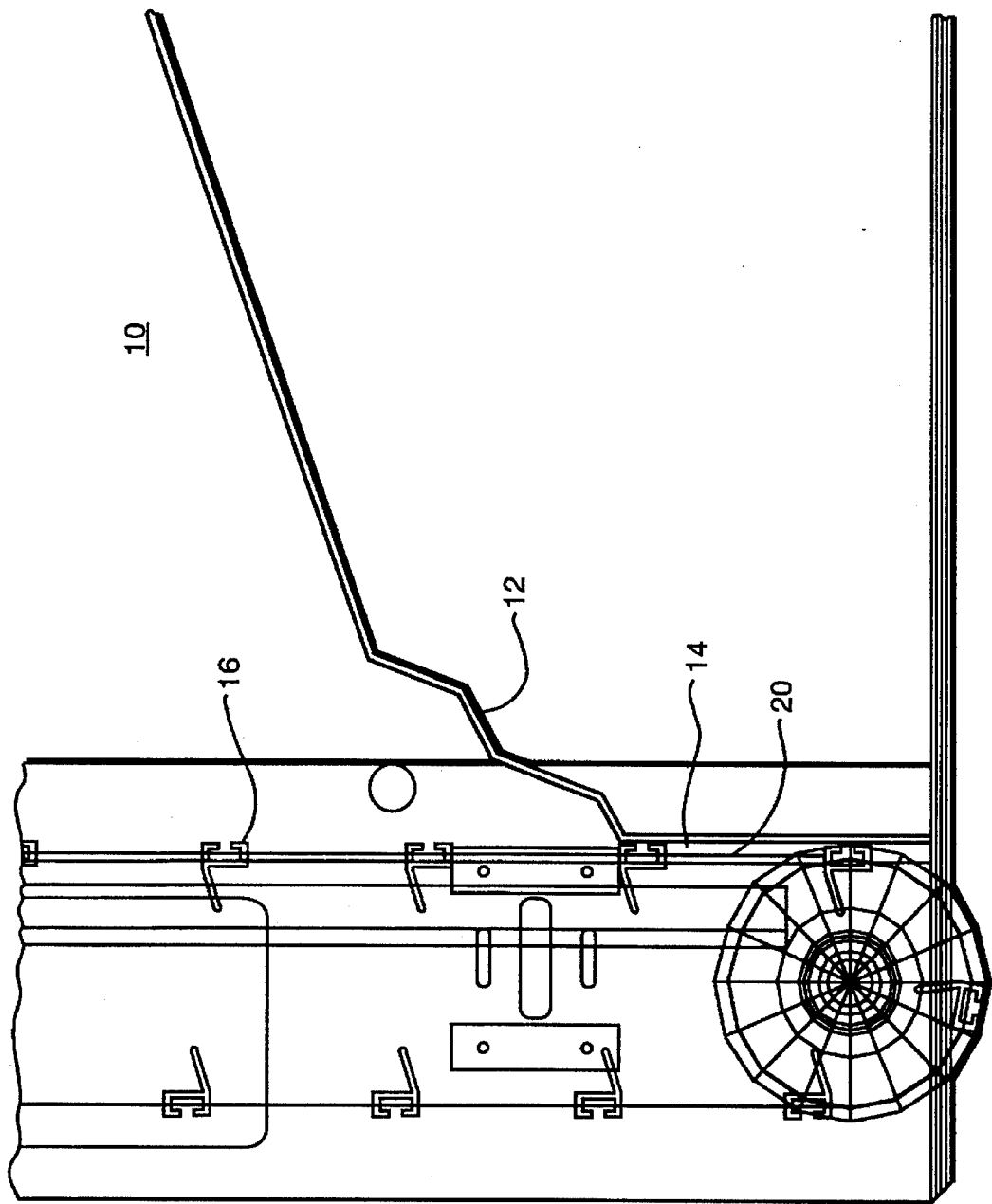

APPARATUS FOR AUTOMATED SORTING OF PLASTIC UTENSILS

BACKGROUND OF THE INVENTION

1. Field of the Invention

The present invention relates to an apparatus for handling a plurality of generally similar elements and more particularly to an apparatus for moving a plurality of irregularly shaped utensils from a stored condition to a remote location in a prearranged or preselected manner and subsequently to deposit them in receptacles such as boxes, trays or other containers positioned nearby.

2. Description of the Prior Art

A recent review of the prior art regarding various techniques to automate the handling a plurality of irregularly shaped plastic utensils can be found in U.S. Pat. No. 5,337,718. That is, it turns out that there have been numerous prior art devices which have been shown to orderly remove uniformly or symmetrically configured objects at or from a remote location. Most of these devices deal with cylindrically shaped articles such as those resulting from the continuous cutting of pipe or other such material. See for example, U.S. Pat. No. 2,159,851. Handling a cylindrical object is considerably less troublesome, since its circular nature results in predictable behavior as it is moved and deposited to a remote location.

It should also be noted that the '718 patent itself described an apparatus for removing a plurality of irregularly shaped plastic eating utensils from a hopper, to a different location, by the combination of a hopper with a ladder conveyor. The hopper described therein was a narrow hopper the width equal to one length of the eating utensil, and into which the utensils had to be systematically stacked in a semi-orientated position. As will be described more fully in the following sections, this particular device does not have many of the advantages of the present invention.

In addition to the above, it is worth noting that one of the inventors of this application is familiar with a prior art device which involved the combination of a hopper and ladder conveyor, which was directed at sorting cylindrical writing markers for packaging, of more uniform configuration than the irregularly shaped objects disclosed herein.

Accordingly, there has been a need to utilize automatic equipment for handling large volumes or irregularly configured objects such as plastic eating utensils. Packaged, ready to eat food for airlines and other forms of transportation as well as for retail outlets which require such objects entail a considerable amount of people and a great deal of time to prepare. Certain devices of this nature, aimed at automation, have also been reported (see, e.g., U.S. Pat. No. 4,892,182). However, there still appears to be nothing in the marketplace that automatically engages such utensils and ultimately delivers them in an appropriate receptacle in a sequential manner so that a moving endless array of such receptacles can be brought into proximity with the device to receive one or more such utensils without manual assistance.

Accordingly, it is an object of this invention to address the long felt need for automatic machinery to handle irregularly shaped, high volume items.

It is also an object of this invention to package, automatically, irregularly shaped linear items such as plastic eating utensils from a random unorientated state as they are delivered from a molding machine.

It is still a further object of this invention to automatically unscramble plastic cutlery, again, in the interests of providing such plastic cutlery to some downstream packaging procedure.

In particular, it is a specific object of this invention to interface a special shaped hopper, with a ladder conveyor, in such a manner as to align the linear shaped products parallel to one another and transversely to the ladder conveyor lifting means, for the purpose of singulating plastic eating utensils for further processes, such as packaging.

Finally, it is an object of the invention to interface the above mentioned hopper/ladder conveyor device with a random to continuous feed system, followed by an interface with a perpendicular feed conveyor, which results in an overall highly efficient automated system for the packaging of irregularly shaped plastic products.

SUMMARY OF THE INVENTION

The present invention comprises a hopper for containment of a plurality of irregularly shaped linear items, interfaced with a ladder conveyor containing lifting bars. The bottom of the hopper comprises a series of sloped regions, including an opening for the upward movement of lifting bars of the conveyor, characterized in that sloped regions act to configure the linear items such the that upward lifting bars of the ladder conveyor cause the items to tumble in a rotating manner providing the delivery of a substantially parallel and transverse alignment of the items to the conveyor lifting bars.

The spacing arrangement of the sloped sections of the hopper bottom, the location of the opening in the hopper bottom, and the design of the lifting bar, are variables which control and effect the self-induced tumbling action of the items in the sloped region of the hopper, and effect the orientation and alignment of the items, for continuous conveyor feed.

In a further embodiment of the present invention the ladder conveyor contains lifting bars which are spaced apart to allow sufficient time for the items or product to escape from the flights, yet closer than the length of the particular item sorted, thereby making it difficult to raise a particular item, on its end. The lifting bars mate into the backwall of the ladder conveyor, and transport rows of product such that the center of gravity of the product leans against the back plate of the conveyor. Finally, the ladder conveyor delivers product to the top of the ladder region, wherein the product is delivered to a series of speed-up conveyor belts, that are located within the ladder conveyor itself, which act to separate and deliver product in a spaced relationship.

The spaced stream of product is then transferred to a means for delivering the product to a continuously moving conveyor system, without the need for pre-accumulation of product, which comprises a flexible infeed region, coupled to an atmospheric flow generated by an impelling device, communicating with a mobile delivery housing, containing a tapered chute. The mobile delivery housing is preferably affixed to linear bearings, and in combination with an electronic sensing means, determines when a product is delivered into a conveyor flight, and moves in the opposite direction to feed the next available flight.

Finally, the filled conveyor flight delivers singulated product to a v-shaped trough which contains a matching v-shaped moving paddle, wherein the trough angle is selected to provide a downward deflection of the delivered product thereby substantially minimizing product bounce, and wherein the v-shaped paddle serves to transfer the product to a packaging system conveyor.

BRIEF DESCRIPTION OF THE DRAWINGS

The invention will be better understood and objects other than those set forth above will become apparent when consideration is given to the following detailed description which makes reference to the annexed drawings wherein like characters of reference designate like parts throughout the several views and wherein:

FIG. 2 is an exploded view of the hopper affixed to the ladder conveyor.

DETAILED DESCRIPTION OF THE INVENTION

Figure 1:
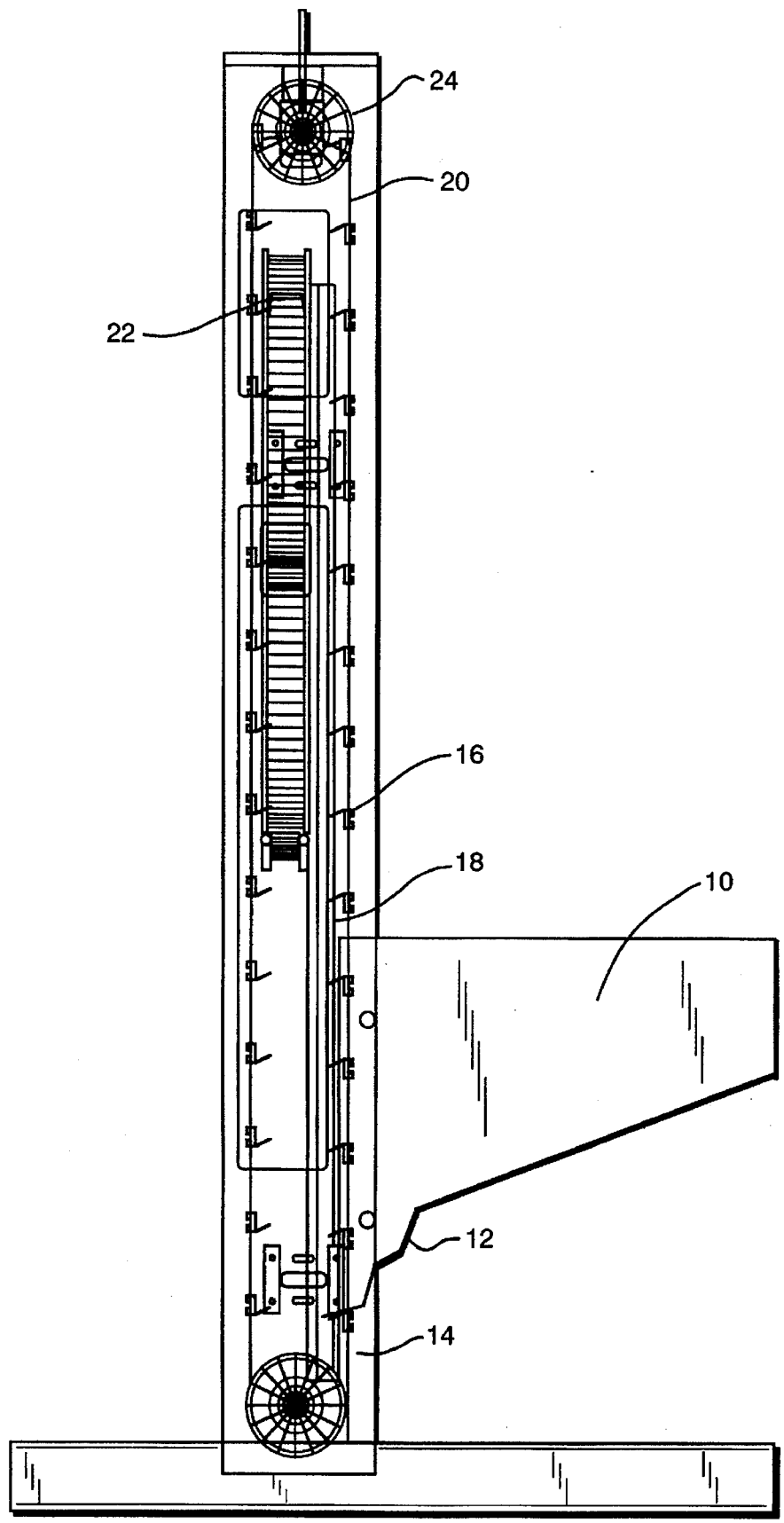
FIG. 1 is a side view and schematic view of the apparatus for handling plastic eating utensils comprising the present invention.
Figure 1A:
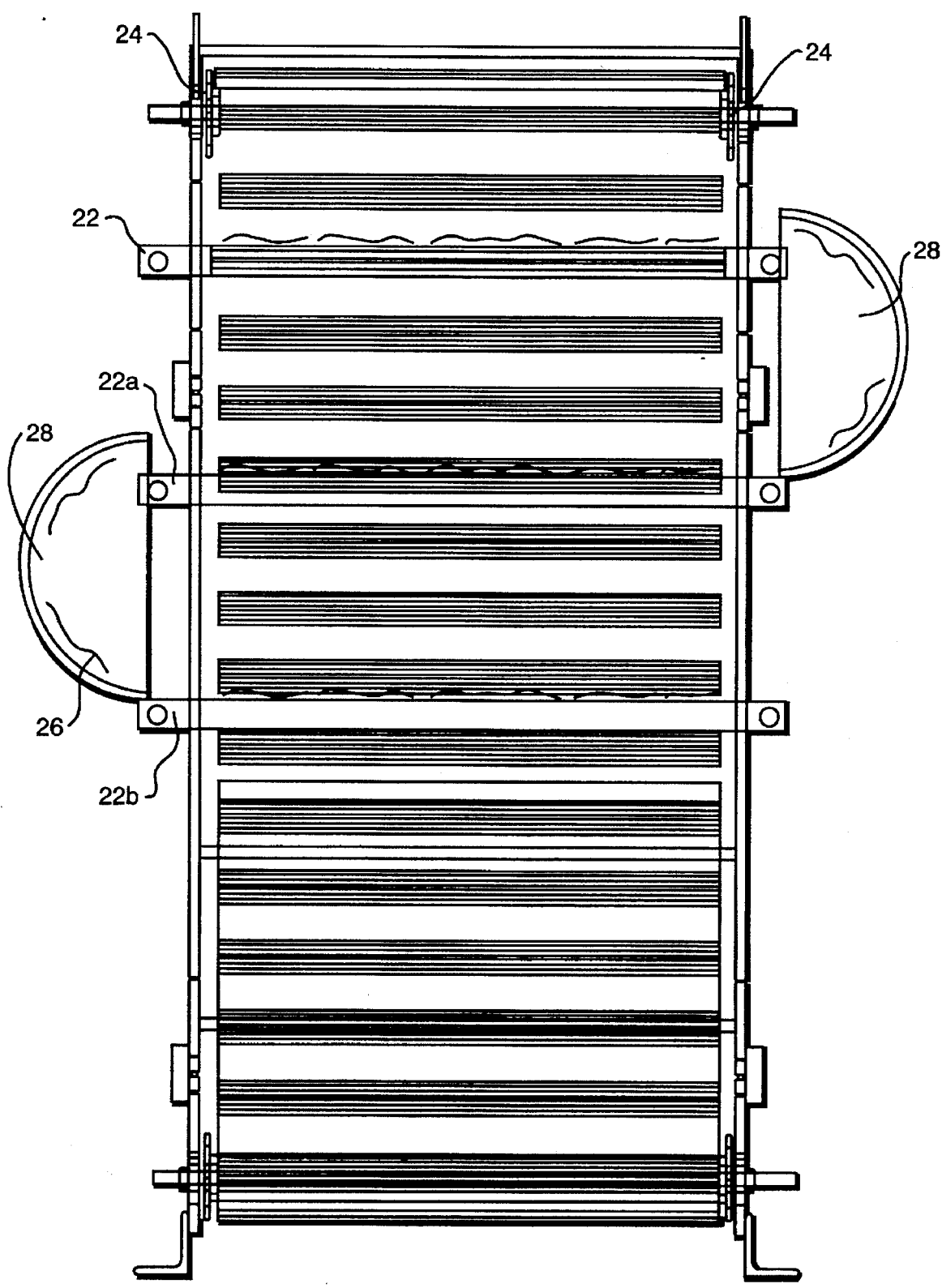
FIG. 1A is front view of the hopper and ladder conveyor.

With reference to FIG. 1, the hopper 10 comprises a bin large enough to hold a substantial quantity of bulk product. Shaped with a sloped bottom the items move down into the hopper bottom 12 where a series of sloped steps and the upward motion of the ladder conveyor lifting bars 16 cause the utensils to tumble in a rotating motion which in turn cause them to align parallel to each other and transversely to the ladder conveyor lifting bars 16. This eliminates the need to stack or orient the utensils before placing it in the hopper 10.

The system hopper 10 (detail FIG. 2) interfaces with the lifting bars 16 connected to the carrier chain 20 on each end to comprise the ladder conveyor. The ladder conveyor lifting bars 16 move up through an opening 14 in the hopper bottom 12 in such a manner as to prevent product from falling out the bottom by opening 14. The tolerance and spacing of the ladder conveyor lifting bars 16 between one another are preferably less than the length of the product. The spacing arrangement of the hopper bottom 12 opening 14 and the lifting bar 16 allow the tumbling action of the product in the lower stepped and sloping shaped hopper bottom, without the product falling through the bottom, which in turn causes the product to rotate and align for semi-orientation.

The carrier chain 20 provides a flight spacing such that the lifter bars 16 are far enough apart to allow sufficient time for product to fall from the flight yet closer than the length of the product making it impossible to raise product standing on end.

Figure 3:
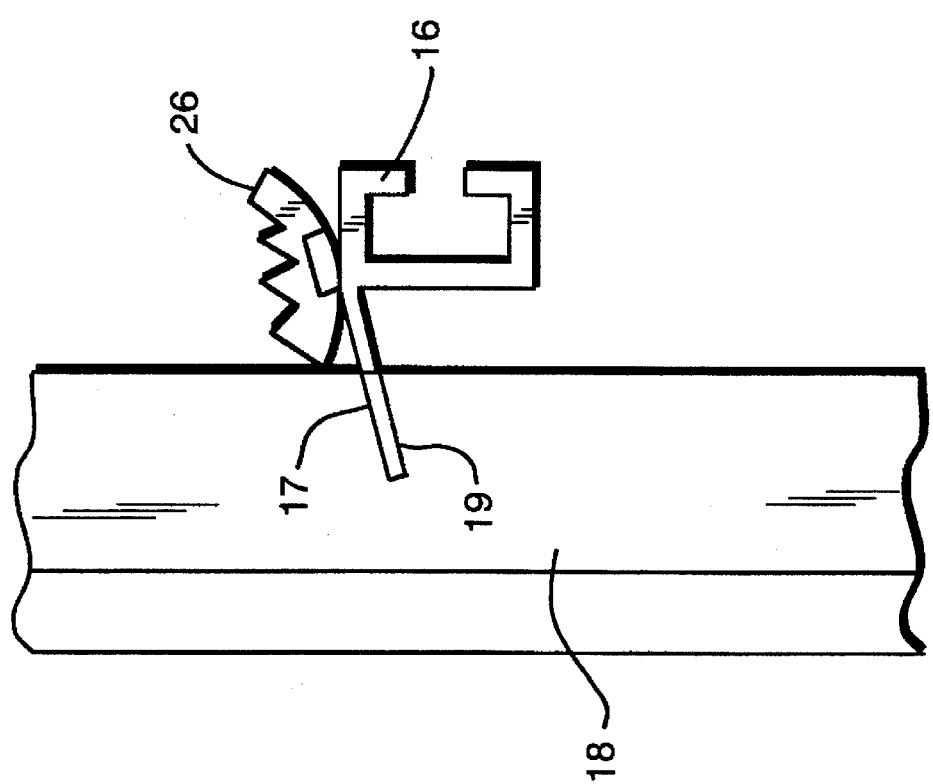
FIG. 3 is a perspective and isolated view of the ladder conveyor lifters.

The carrier shape is a bar 16 (detail FIG. 3) with grooves 17 which mate into grooves 19 in a backwall 18 of the ladder conveyor. The grooved backplate can be tilted to readjust the geometrical positioning of a given utensil on the surface of the lifting bar. In addition, the lifter bars themselves, which travel in the grooves of the backplate, can be adjusted inwardly and outwardly into said grooves, which also effects the amount of surface in the lifting bar for transporting product. This allows adjustment of the exposed surface of the lifter bar 16 to accommodate different product profiles 26 for particularly but not exclusively such items as plastic eating utensils.

The lifter bar 16 design will pick up product 26 who's center of gravity is such to allow it to lean against the back plate 18o Variations in the shape of the flight lifter bars 16 can be made such as angling toward the hopper 10 with a small lip that will hold a product that it catches. This design flexibility and tipping of the entire ladder conveyor allows the largest range of product variation with the least amount of change-over time.

The main sprocket 24 on the conveyor has a particular specification such that each revolution of this sprocket lifts the proper number of flights, therefore, at a very slow rotational speed. The length of the lifter bar 16 is such that multiple product 26 pieces may be lifted at the same time on each flight.

Each lifting bar 16 is such that a row of the linear shaped product 26 is delivered to the top of the ladder conveyor whereby the product 26 is moved to the first speed up belt conveyor 22 located in the center section of the ladder conveyor between the ladder conveyor upward moving lifter flight bars 16 and the downward flight return.

Air assist ensures movement of the product positively through the transition onto the continuously moving belt conveyor 22. At the end of the belt conveyor 22 a non-moving, half circle shaped, enclosed transfer guide 28 delivers the product to the second speed up belt conveyor moving in the transverse direction to the first. It can be appreciated that the product is delivered at speeds sufficient to maintain a centrifugal force against the circular transfer guide 28, as it travels down to a second speed-up conveyor, labeled 22A.

Another circular transfer guide delivers the product to the third speed up belt 22B reversing the direction once more. Each belt conveyor speeds up substantial revolutions for the purpose of separating the linear product into a steady delivery of items with space in between to complete the first step of unscrambling random bulk product into a spaced singulated delivery stream.

Random to Continuous Feed

This aspect of the invention relates to the introduction of randomly spaced product for the purpose of delivery into a continuously moving conveying system without the use of pre-accumulation of product. According to the invention the flexible infeed transfer 30 (FIG. 4) is an atmospheric flow 29 generated by an impelling device or other means suitable to the particular application. The system requires some minimum amount of space between product while accommodating a wide range of additional space in random increments such as missing product items.

The mobile delivery housing 32 has a curved tapered chute particularly shaped to eliminate bounce by presenting the product at the correct angle allowing rapid mobility of the product. This is essential for the delivery housing 32 to have time to move to the next conveyor flight available tray 42. A guarding grid 56 over the flight tray 42 captures the product while allowing air escapement.

The mobile delivery housing 32 is preferably mounted on linear bearings 40 on each side in parallel to the perpendicular feed conveyor flight. An electronic sensing device 36, 38 determines when a product is delivered into the flight and rapidly moves in the opposite direction until it is positioned over the next available flight. The movement is controlled electronically.

The timing variation due to irregular spacing is transformed into regular time intervals by a procedure of tracking the flight, detecting when a product item is delivered into the flight and then rapidly moving back to the next available flight. This process is repetitive to the end of maintaining the delivery of product into every flight of the set speed continuous conveyor flight.

Perpendicular Feed Conveyor

This aspect of the invention provides a means of delivering product in such a manner as to interface with the infeed conveyor of a packaging system. The system transfers and changes the direction of the product movement. The perpendicular feed conveyor transfers the product from the continuous conveyor flight, stabilized, and at the desired time sequence.

To begin with, and as noted above, the product items are first placed in the perpendicular feed conveyor flight tray 42 the automated random to equally spaced delivery system. The perpendicular feed conveyor has an arrangement of the flight trays 42 whereby the width of the trays are parallel to each other. Each flight tray 42 has a male lip on one side and a female such that when mounted on the carrier chain 54 the trays 42 overlap each other in such a manner as to eliminate any gap or space between trays whereby the product may be transferred without hindrance. Since the trays 42 fit together without actually being attached, they separate and rejoin as they pass around the turn sprocket 52.

The tray 42 is a solid molded piece with an inside rectangular shape. Without space between trays 42, and with the rectangular receptacle cavity design, the need for the product such as plastic eating utensils to be presented with full orientation is eliminated. For example, with plastic eating utensils the handles do not have to be pointed the same direction and the curvature in the bowls can be either up or down. This substantially reduces the complexity of the unscrambling process since only end-to-end single axis orientation is required to effectively transfer into the perpendicular feed conveyor.

Figures 4, 4A:
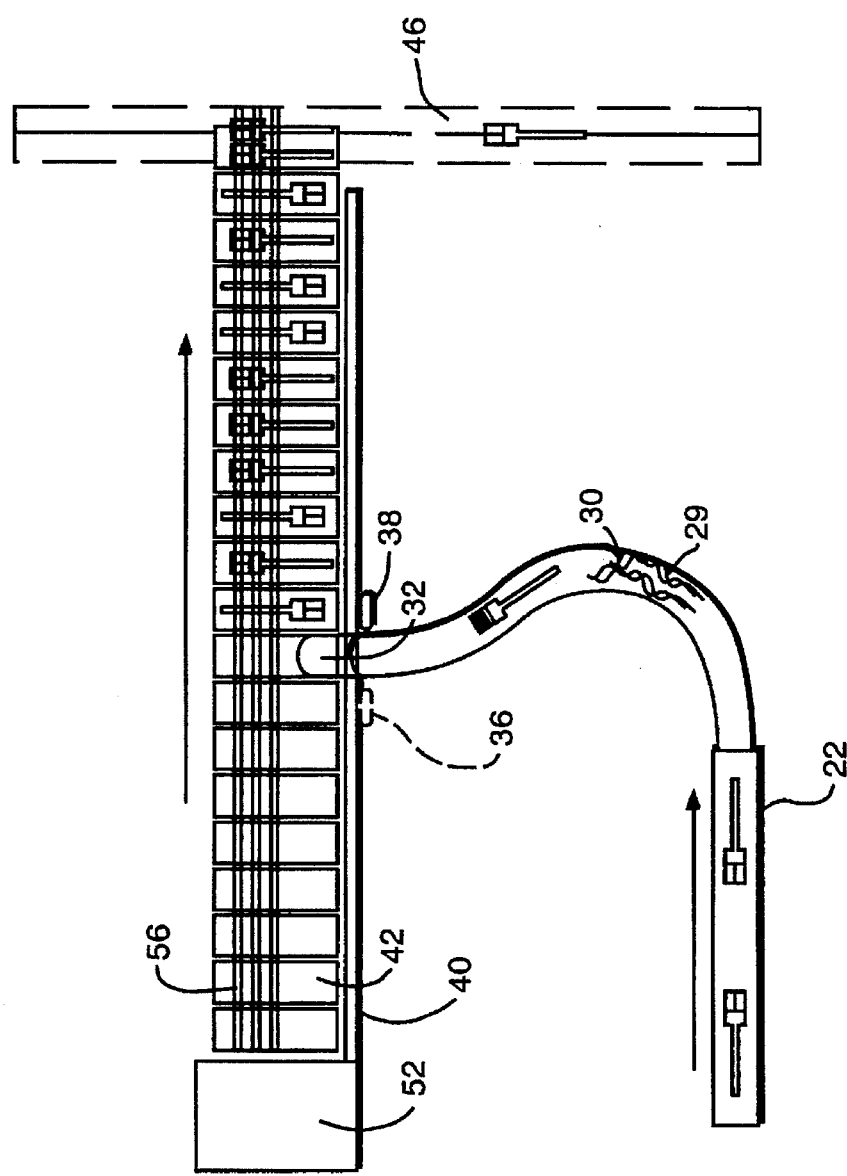
FIG. 4 is a view of the random to continuous feed mechanism.
FIG. 4A is a cross-sectional view of the random to continuous feed mechanism.
Figure 5A:
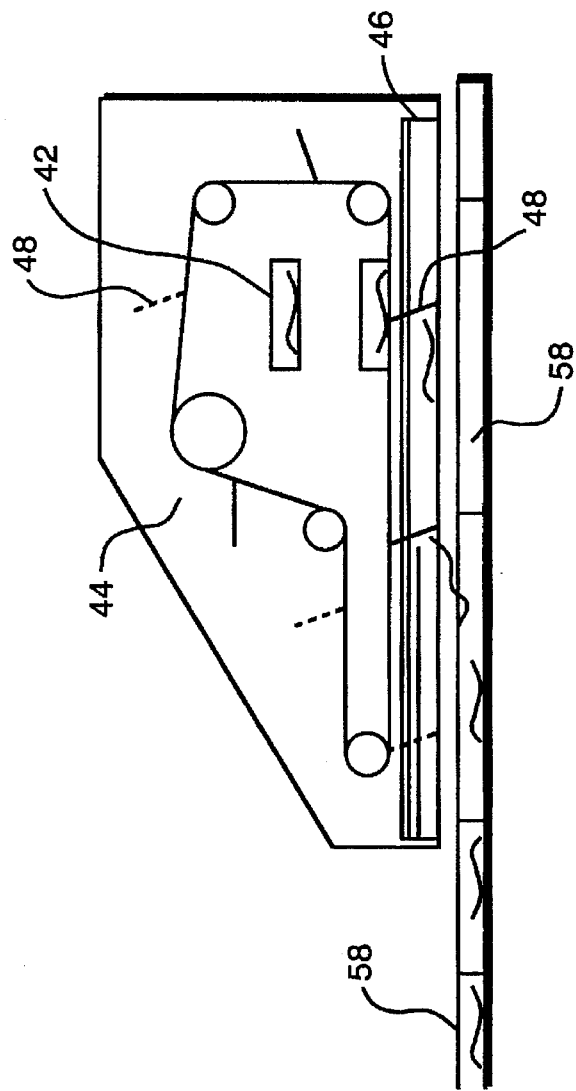
FIG. 5A is a second perspective view of the perpendicular feed conveyor.
Figure 5:
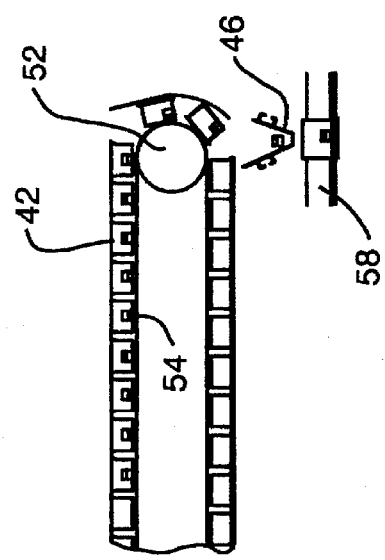
FIG. 5 is a view of the perpendicular feed conveyor.

The product is placed side by side in the flight tray 42 changing for the end-to-end orientation as it is delivered by the mobile deliver housing 32 (FIG. 4). Since the product is much longer than it is wide, the side-by-side position allows a much slower linear speed to deliver the same quantity of product. More time to place the product in position makes automation feasible and less linear speed greatly reduces machine wear.

The product is deposited in a "V" shaped trough 46 with the angle such that bouncing of the product is minimized. A matching "V" shaped paddle 48 is carried through the trough 46 in time with the transfer of the product from the random to continuous feed section and the infeed of the packaging system conveyor 58. Since the product is positioned in front of each paddle 48, the product is effectively transferred into the packaging system flight 58.

Therefore, as will be appreciated by those skilled in the art, the foregoing is illustrative of the basic principles of the invention. Since numerous modifications and changes will readily occur to those skilled in the art, the present invention is not limited to the exact construction and operation shown and described. All suitable modifications and equivalents that fall within the scope of the appended claims are deemed within the present inventive concept.

We claim:

1. An apparatus for handling irregular shaped linear items, comprising:

a hopper for holding a plurality of irregular shaped linear items;

lifting means, cooperating with the hopper, for upwardly removing the irregular shaped linear items from the hopper, said lifting means rotating the irregular shaped linear items in the hopper and aligning the irregular shaped linear items parallel to one another and transverse to said lifting means;

means, receiving the irregular shaped linear items from said lifting means, for separating the irregular shaped linear items in a spaced relationship, a flexible infeed region coupled to an atmospheric flow, for receiving the irregular shaped linear items from said means for separating, and a mobile delivery housing communicating with said flexible infeed region for delivering the irregular shaped linear items into a continuously moving conveyor system.

2. The apparatus of claim 1, wherein the lifting means comprises lifting bars attached to an upwardly moving carrier chain, and comprises a back plate, wherein the lifting bars position the irregular shaped linear items so that they lean against said back plate while moving upward.

3. The apparatus of claim 2, wherein a space between each of the lifting bars is less than the length of one of the irregular shaped linear items.

4. The apparatus of claim 2, wherein the back plate is grooved and said lifting bars contain grooves which mate into said grooved back plate.

5. The apparatus of claim 1, wherein said means for separating the irregular shaped linear items comprises a plurality of speed-up conveyor belts.

6. The apparatus of claim 1, wherein the mobile delivery housing contains a tapered chute.

7. The apparatus of claim 1, further including an electronic sensing means disposed proximate said mobile delivery housing, wherein said electronic sensing means is responsive to the irregular shaped linear items for determining when each of said irregular shaped linear items has been delivered to said continuously moving conveyor system, and for positioning said apparatus for delivery of irregular shaped linear items to said continuously moving conveyor system.

8. The apparatus of claim 6, wherein the mobile delivery housing is mounted on linear bearings.

9. The apparatus of claim 1, wherein the continuously moving conveyor system comprises a plurality of conveyor flights, wherein said flights contain a means for capturing irregular shaped linear items from said means for delivering irregular shaped linear items while allowing air escapement.

10. The apparatus of claim 9, wherein the continuously moving conveyor system delivers irregular shaped linear items to a v-shaped trough, wherein the trough angle is selected to provide downward deflection of irregular shaped linear items delivered by said moving conveyor system.

11. The apparatus of claim 10, including a matching v-shaped paddle.

12. A sorting apparatus, for sorting a plurality of items, said sorting apparatus comprising:

at least one hopper, for receiving said plurality of items, said at least one hopper including a hopper bottom region;

a lifting device having a top region and having a bottom region disposed proximate said hopper, said lifting device including:

a plurality of lifting bars, for receiving said plurality of items from said hopper when each of said plurality of lifting bars is positioned at said bottom region of said lifting device proximate said hopper bottom region, and for lifting said plurality of items toward said top region of said lifting device, said plurality of lifting bars having a predetermined spacing between each of said plurality of bars, wherein said predetermined spacing is less than a length of one of said plurality of items; and a back plate, for mating with said plurality of lifting bars as said plurality of lifting bars move from said bottom region to said top region of said lifting device, wherein said at least one of said plurality of items leans against said back plate when said at least one lifting bar lifts said at least one of said plurality of items.

13. The sorting apparatus of claim 12, wherein said back plate includes grooves and said plurality of lifting bars include matching protrusions which mate with said grooves in said back plate.

14. The sorting apparatus of claim 12, wherein said hopper bottom includes a series of sloped steps, and wherein said plurality of items are aligned as said plurality of items slide down said series of sloped steps.

15. A sorting apparatus, for sorting a plurality of items, said sorting apparatus comprising:

at least one hopper, for receiving said plurality of items, said at least one hopper including a hopper bottom region;

a lifting device having a top region and having a bottom region disposed proximate said hopper, said lifting device including at least one lifting bar, for receiving at least one of said plurality of items from said hopper when said at least one lifting bar is positioned at said bottom region of said lifting device proximate said hopper bottom region, and for lifting said at least one of said plurality of items toward said top region of said lifting device;

at least first and second speed-up conveyer belts, for separating and conveying said plurality of items in a spaced relationship, said first speed-up conveyer belt disposed proximate said top region of said lifting device, for receiving said at least one of said plurality of items from said lifting device, and said second speed-up conveyer belt disposed proximate said first speed-up conveyer belt, for receiving said at least one of said plurality of items from said first speed-up conveyor belt, wherein a predetermined speed of said second speed-up conveyer belt is greater than a predetermined speed of said first speed-up conveyer belt; and an infeed region, for receiving said plurality of items from said at least first and second speed-up conveyer belts, said infeed region being coupled to an atmospheric flow, for delivering said plurality of items to a continuously moving conveyor system.

16. The sorting apparatus of claim 15, further including a semi-circular transfer guide, for receiving said at least one of said plurality of items from said first speed-up conveyer belt and for transferring said at least one of said plurality of items to said second speed-up conveyer belt.

17. The sorting apparatus of claim 15, further including a third speed-up conveyor belt disposed proximate said second speed-up conveyer belt, for receiving said at least one of said plurality of items from said second speed-up conveyor belt, and wherein a predetermined speed of said third speed-up conveyer belt is greater than said predetermined speed of said second speed-up conveyer belt.

18. A sorting apparatus, for sorting a plurality of items, said sorting apparatus comprising:

at least one hopper, for receiving said plurality of items, said at least one hopper including a hopper bottom region;

a lifting device having a top region and having a bottom region disposed proximate said hopper, said lifting device including at least one lifting member, for receiving at least one of said plurality of items from said hopper when said at least one lifting member is positioned at said bottom region of said lifting device proximate said hopper bottom region, and for lifting said at least one of said plurality of items toward said top region of said lifting device;

a separating and conveying device disposed proximate said top region of said lifting device, for receiving said at least one of said plurality of items from said lifting device, and for separating and conveying said plurality of items in a spaced relationship; and a delivery mechanism operatively coupled to said separating and conveying device, said delivery mechanism including:

a flexible infeed region, for receiving said plurality of items in said spaced relationship from said separating and conveying device, wherein an atmospheric flow moves said plurality of items in said spaced relationship; and a mobile delivery housing, for delivering said plurality of items in said spaced relationship to a conveyor system.

19. The sorting apparatus of claim 18, wherein said mobile delivery housing is mounted on a linear bearing proximate said conveyer system, for moving said mobile delivery housing along said conveyer system, and for delivering each of said plurality of items to a region of said conveyer system.

20. The sorting apparatus of claim 18, wherein said delivery mechanism further includes an electronic sensing device, responsive to delivery of each of said plurality of items, and wherein said mobile delivery housing is responsive to said electronic sensing device, for movement after delivery of said each of said plurality of items.

21. The sorting apparatus of claim 18, wherein said conveyor system includes a plurality of item receiving regions, for receiving respective ones of said plurality of items while allowing air escapement.

22. The sorting apparatus of claim 18, wherein said mobile delivery housing includes a tapered chute coupled to said flexible infeed region.

23. A sorting apparatus, for sorting a plurality of items, said sorting apparatus comprising:

at least one hopper, for receiving said plurality of items, said at least one hopper including a hopper bottom region;

a lifting device having a top region and having a bottom region disposed proximate said hopper, said lifting device including at least one lifting member, for receiving at least one of said plurality of items from said hopper when said at least one lifting member is positioned at said bottom region of said lifting device proximate said hopper bottom region, and for lifting said at least one of said plurality of items toward said top region of said lifting device;

a separating and conveying device disposed proximate said top region of said lifting device, for receiving said at least one of said plurality of items from said lifting device, and for separating and conveying said plurality of items in a spaced relationship;

a delivery mechanism operatively coupled to said separating and conveying device, for receiving said plurality of items in said spaced relationship;

a conveyor system having a plurality of item receiving regions, for receiving each of said plurality of items in said spaced relationship from said delivery mechanism; and a trough disposed proximate said conveyer system, for receiving said each of said plurality of items from said conveyor system, and a sliding mechanism, for sliding said each of said plurality of items along said trough toward a packing system conveyor.

* * * * *